US011405495B2

(12) United States Patent
Gao et al.

(10) Patent No.: US 11,405,495 B2
(45) Date of Patent: Aug. 2, 2022

(54) ELECTRONIC APPARATUS

(71) Applicant: BEIJING XIAOMI MOBILE SOFTWARE CO., LTD., Beijing (CN)

(72) Inventors: Jing Gao, Beijing (CN); Lintao Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 313 days.

(21) Appl. No.: 16/688,805

(22) Filed: Nov. 19, 2019

(65) Prior Publication Data

US 2021/0067617 A1    Mar. 4, 2021

(30) Foreign Application Priority Data

Aug. 30, 2019  (CN) .......................... 201910815125.2

(51) Int. Cl.
*H04M 1/02* (2006.01)
*H04N 5/225* (2006.01)
*H04N 5/232* (2006.01)

(52) U.S. Cl.
CPC ........ *H04M 1/0264* (2013.01); *H04N 5/2254* (2013.01); *H04N 5/23216* (2013.01)

(58) Field of Classification Search
None
See application file for complete search history.

(56) References Cited

U.S. PATENT DOCUMENTS

| 8,179,462 | B2 * | 5/2012 | Shintani | H01L 27/14603 |
| | | | | 348/294 |
| 11,188,118 | B2 * | 11/2021 | Mathew | G06F 1/1686 |
| 2009/0009628 | A1 * | 1/2009 | Janicek | H04N 7/144 |
| | | | | 348/231.99 |
| 2011/0285861 | A1 | 11/2011 | Maglaque | |

(Continued)

FOREIGN PATENT DOCUMENTS

| CN | 108490718 A | 9/2018 |
| CN | 108900738 A | 11/2018 |
| CN | 110012136 A | 7/2019 |

OTHER PUBLICATIONS

Extended European Search Report in Application No. 19219821.6, dated Jul. 2, 2020.

(Continued)

*Primary Examiner* — Clayton E. LaBalle
*Assistant Examiner* — Diana Hancock
(74) *Attorney, Agent, or Firm* — Syncoda LLC; Feng Ma

(57) ABSTRACT

An electronic apparatus includes a screen and a camera assembly. By disposing the camera assembly under the screen and setting the structural size of the light transmitting portion smaller than the minimum resolution threshold of the naked eyes, the light transmitting portion on the screen is invisible to the naked eyes. The camera includes a plurality of photographing sections, and collects partial image data in the scene to be photographed by cooperation of each of the photographing sections with a light transmitting hole. The main control integrates all the partial image (Continued)

data, and finally produces an overall image of the scene to be photographed. As such, a photographing function of the camera assembly of the electronic apparatus can be ensured, and the screen-to-body ratio of the screen can be increased, without interference of the camera assembly with display effects of the screen.

20 Claims, 5 Drawing Sheets

(56) References Cited

U.S. PATENT DOCUMENTS

| | | | |
|---|---|---|---|
| 2012/0051253 A1* | 3/2012 | Ji ............................ | H04L 45/10 370/252 |
| 2012/0069042 A1* | 3/2012 | Ogita ..................... | H04N 7/144 345/589 |
| 2013/0088630 A1* | 4/2013 | Kanade .................. | H04N 7/144 348/333.01 |
| 2013/0252667 A1 | 9/2013 | Senda | |
| 2014/0118591 A1* | 5/2014 | Maglaque ............ | H04N 5/2254 348/308 |
| 2016/0337570 A1* | 11/2016 | Tan ......................... | G06F 3/005 |
| 2017/0084231 A1* | 3/2017 | Chew ...................... | G09G 3/20 |
| 2020/0236260 A1* | 7/2020 | Yang .................... | H04M 1/0264 |
| 2020/0292882 A1* | 9/2020 | Nakamura .......... | H04M 1/0264 |
| 2021/0067617 A1* | 3/2021 | Gao .................. | H04N 5/23216 |
| 2021/0084236 A1* | 3/2021 | Han .................. | G06K 9/00013 |
| 2021/0210533 A1* | 7/2021 | Cho ....................... | G03B 11/00 |

OTHER PUBLICATIONS

China first office action in Application No. 201910815125.2, dated Mar. 23, 2022.

\* cited by examiner

ELECTRONIC APPARATUS

CROSS-REFERENCE TO RELATED APPLICATION

This application claims priority to Chinese Patent Application No. 201910815125.2 filed on Aug. 30, 2019, the entire contents of which are incorporated herein by reference.

BACKGROUND

A front camera of an electronic apparatus such as a mobile phone is usually disposed on a front side of an apparatus body of the electronic apparatus and located outside a display area of a screen, so that it occupies a portion of the screen on the front side of the electronic apparatus, increasing a size of a non-display area of the screen and thereby reducing a screen-to-body ratio.

SUMMARY

The present disclosure relates generally to the field of electronics, and more specifically to an electronic apparatus.

Various embodiments of the present disclosure provide an electronic apparatus to increase the screen-to-body ratio while ensuring photographing and display functions of the electronic apparatus.

According to an aspect of embodiments of the present disclosure, there is provided an electronic apparatus, comprising a screen and a camera assembly;

wherein the screen is provided with at least one light transmitting portion having a structural size smaller than a minimum visual resolution threshold of naked eyes;

wherein the camera assembly is disposed under the screen, and includes a main control and at least one camera. The camera includes a plurality of photographing sections, and a photographing angle of view of each of the photographing sections is for correspondingly photographing a partial area of a scene to be photographed. The plurality of photographing sections correspondingly cooperate with the at least one light transmitting portion to collect partial image data of the scene to be photographed, and the main control integrates the partial image data to produce an overall image of the scene to be photographed.

It should be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure, wherein.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Various embodiments of the present disclosure can address how to arrange the front camera to increase a screen-to-body ratio while ensuring photographing and displaying functions of the electronic apparatus. Typically, a front camera of an electronic apparatus such as a mobile phone is disposed on a front side of an apparatus body of the electronic apparatus and located outside a display area of a screen, so that it occupies a portion of the screen on the front side of the electronic apparatus, increasing a size of a non-display area of the screen and thereby reducing a screen-to-body ratio.

Figure 1:
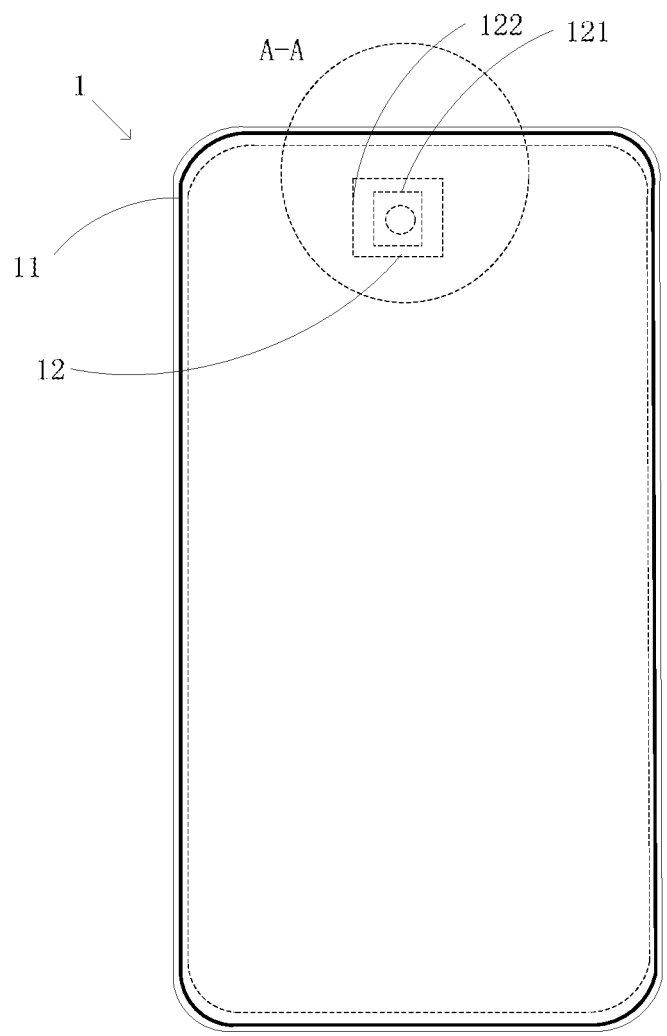
FIG. 1 is a structural schematic view of an electronic apparatus according to some embodiments of the present disclosure.
Figure 2:
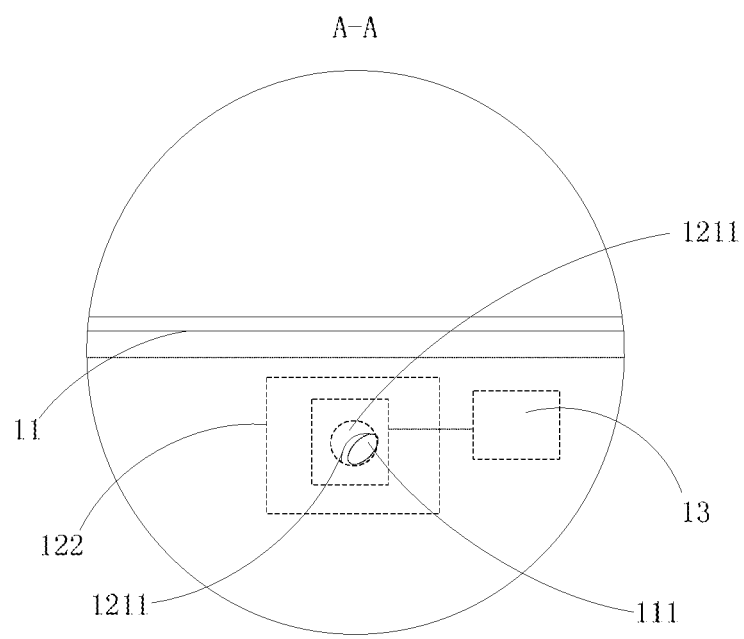
FIG. 2 is a partially enlarged view of A-A area in FIG. 1.

FIG. 1 is a structural schematic view of an electronic apparatus according to some embodiments of the present disclosure. FIG. 2 is a partially enlarged view of A-A area in FIG. 1.

As shown in FIG. 1 and FIG. 2, the electronic apparatus 1 includes a screen 11 and a camera assembly 12. The screen 11 is provided with at least one light transmitting portion 111 having a structural size smaller than a minimum visual resolution threshold of naked eyes. The camera assembly 12 is disposed under the screen 11, and includes a main control 122 and at least one camera 121. The camera 121 includes a plurality of photographing sections 1211, and a photographing angle of view of each of the photographing sections 1211 corresponds to a partial area of a scene to be photographed. The photographing sections 1211 cooperate with the light transmitting portion 111 correspondingly so as to collect partial image data of the scene to be photographed. The main control 122 integrates all the partial image data to produce an overall image of the scene to be photographed.

By disposing the camera assembly 12 of the electronic apparatus 1 under the screen 11 and setting the structural size of the light transmitting portion 111 smaller than the minimum resolution threshold of the naked eyes, the light transmitting portion 111 on the screen 11 is invisible to the naked eyes. The camera 121 of the camera assembly 12 includes a plurality of photographing sections 1211, and collects partial image data in the scene to be photographed by cooperation of each of the photographing sections 1211 with a light transmitting hole. The main control 122 integrates all the partial image data, and finally produces an overall image of the scene to be photographed. Through above structural configuration, not only realization of a photographing function of the camera assembly 12 of the electronic apparatus 1 is ensured, but also the screen-to-body ratio of the screen 11 is increased, while avoiding interference of the camera assembly 12 with display effects of the screen 11.

In the electronic apparatus 1, the structural size of the light transmitting portion 111 may be any feature size based on an overall structural shape of the light transmitting portion 111. The feature size may be a size that is able to directly change the structural shape of the light transmitting portion 111. For example, when the light transmitting portion 111 has a cross-section in a shape of a circle, its structural size is a diameter d of the circular light transmitting portion 111. When the light transmitting portion 111 has a cross-section in a shape of a rectangle, its structural size may be a length of a long side or a short side of the rectangular light transmitting portion 111. When the light transmitting portion 111 has a cross-section in a shape of a polygon, its structural size may be a circumscribed circle diameter of the polygonal structure or the like.

The structural size of the light transmitting portion 111 is smaller than the minimum visual resolution threshold of the naked eyes. The minimum visual resolution threshold of the naked eyes defines a minimum size range that can be observed by the naked eyes of human. When the structural size of the light transmitting portion 111 is smaller than a value within the range, the user cannot observe the light transmitting portion 111 so that, from the appearance, the screen 11 presents a complete appearance and display effect. For setting the visual resolution threshold in consideration of individual differences of different users, an average value of visual resolution thresholds of a large number of users obtained through a large number of experiments may be used as the above-mentioned minimum visual resolution threshold of the naked eyes; alternatively, a theoretical value of the minimum size range that the naked eyes of human can observe may be used as the above-mentioned minimum visual resolution threshold of the naked eyes. Setting of the minimum visual resolution threshold of the naked eyes can be freely selected based on factors affecting the human visual experience, such as different application scenarios (daytime, night, etc.), user groups (race, age, etc.), which is not specifically limited in the present disclosure.

Preferably, based on visual observation capability of the naked eyes and setting requirements and machining process of the screen 11, the minimum visual resolution threshold of the naked eyes may be less than or equal to 100 micrometers so that concealability of the light transmitting portion 111 can be enhanced, and the effect of complete appearance and display of the screen 11 can be improved. Alternatively, based on the application scenarios and different user groups of the screen 11, the range of the minimum visual resolution threshold of the naked eyes may be slightly increased. For example, the minimum visual resolution threshold of the naked eyes is less than or equal to 150 micrometers so that the difficulty of machining the screen 11 is reduced in the condition of ensuring the complete appearance and display effect of the screen 11.

In the above embodiment, the structural size of the light transmitting portion 111 may be further smaller than the structural size of a display unit in the screen 11. The display unit of the screen 11 is a pixel point of the screen 11 at a preset resolution. As an example, the pixel point is in a shape of a square, and the cross-section of the light transmitting portion 111 is in a shape of a circle. The structural size of each of the light transmitting portion 111 and the display unit can be indicated respectively by the concrete feature size of structural shape thereof. Specifically, if the structural size of the light transmitting portion 111 is smaller than the structural size of the display unit, it may be a circumstance that a diameter d of the circular light transmitting portion 111 is smaller than a diameter of an inscribed circle of the square pixel point. Accordingly, based on the structural size of the light transmitting portion 111 being smaller than the structural size of one or more pixel points, the light transmitting portion 111 further reduces the influence thereof on the display effect of the screen 11.

According to different resolutions of the screen 11, the structure size of a single pixel point may in a range from 40 micrometers to 50 micrometers. That is, the structural size of the light transmitting portion 111 may be a value less than 50 micrometers or less than 40 micrometers, and thus interference with the display effect of the screen 11 is reduced in terms of size.

In the above embodiment, the screen 11 may be provided with one or more light transmitting portions 111, which is not limited by the present disclosure. By providing one light transmitting portion 111, interference with the structure and the display function of the screen 11 can be reduced while facilitating machining and manufacturing thereof. As a contrast, providing a plurality of light transmitting portions 111 can facilitate each of photographing sections 1211 of the camera 121 to collect image data with respect to the scene to be photographed. Following description will be provided for both one light transmitting portion 111 and a plurality of light transmitting portions 111.

Since the structural size of the light transmitting portion 111 is limited to be smaller than the minimum resolution threshold of the naked eyes in order to ensure invisibility of the light transmitting portion 111 to the naked eyes, each of photographing sections 1211 of the camera 121 has an overall size larger than the light transmitting portion 111. Thus, the light transmitting portion 111 cannot cooperate with all photographing sections 1211 at the same time.

In a case that one light transmitting portion 111 is provided on the screen 11, as the embodiment shown in FIG. 1 and FIG. 2, the camera assembly 12 includes one camera 121. Different portions of a lens of the camera 121 form a plurality of photographing sections 1211 and the camera 121 is movably assembled under the screen 11, so that each of the photographing sections 1211 of the camera 121 can alternately cooperate with the light transmitting section 111. When the camera 121 is movably assembled under the screen 11, it can be realized that each of the photographing sections 1211 cooperates with the light transmitting section 111 respectively based on movement of the camera 121. Furthermore, image data of each of regions of the scene to be photographed is collected by different photographing sections 1211. The main control 122 integrates image data of all regions to finally produce an overall image of the scene to be photographed. As mentioned above, the camera assembly 12 includes one camera 121, thereby reducing occupying space and cost of the camera assembly 12.

Figure 3:
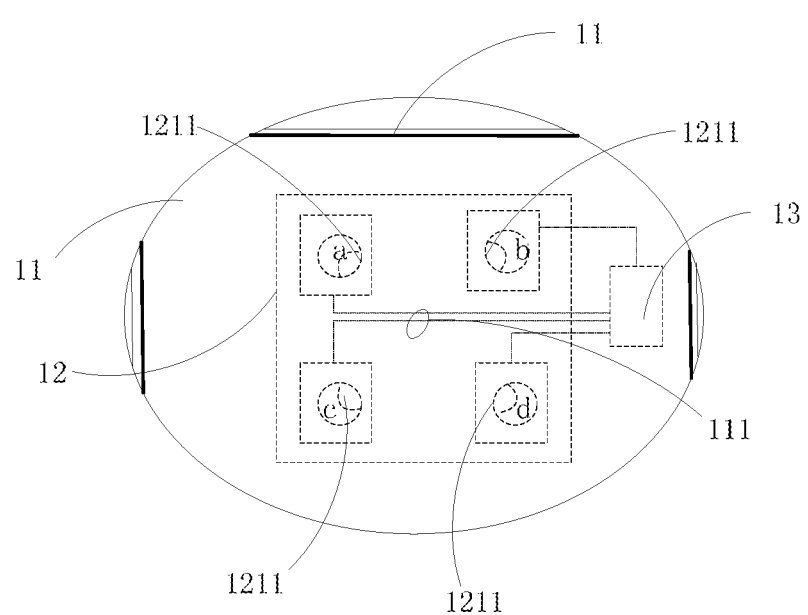
FIG. 3 is a partially enlarged schematic view of an electronic apparatus in some other embodiments of the present disclosure.

In the embodiment shown in FIG. 3, the camera assembly 12 includes a plurality of cameras 121. Specified portions of each of lens of the cameras 121 form a plurality of photographing sections 1211 and the cameras 121 are movably assembled under the screen 11 so that each of the photographing sections 1211 formed by the specified portions of the cameras 121 alternately cooperates with the light transmitting sections 111. For example, as shown in FIG. 3, the camera assembly 12 includes four cameras 121 with reference numerals "a", "b", "c", and "d". The photographing section 1211 formed by the specified portion of the lens of "a" camera 121 is located at a lower right corner of the "a" camera for collecting partial image data of an upper left region of the scene to be photographed. The photographing section 1211 formed by the specified portion of the lens of "b" camera 121 is located at a lower left corner of the "b" camera 121 for collecting partial image data of an upper right region of the scene to be photographed. The photographing section 1211 formed by the specified portion of the lens of "c" camera 121 is located at an upper right corner of the "c" camera 121 for collecting partial image data of an lower left region of the scene to be photographed. The photographing section 1211 formed by the specified portion of the lens of "d" camera 121 is located at an upper left corner of the d camera 121 for collecting partial image data of a lower right region of the scene to be photographed. Each of the photographing sections 1211 of the four cameras 121 with the reference numerals "a", "b", "c", "d" alternately cooperates with the light transmitting section 111 respectively to collect respective partial image data, and the main control 122 integrates the respective partial image data to finally produce an overall image of the scene to be photographed. As mentioned above, the camera assembly 12 includes a plurality of cameras 121 and each of the plurality of cameras 121 performs data transmission with the main control 122, thereby improving convenience of collecting the respective partial image data and operation efficiency of the main control 122.

Furthermore, the plurality of cameras 121 can be disposed along a circumferential direction of the light transmitting portion 111 so that occupying space of the camera assembly 12 is reduced as a whole on one hand, and movement convenience of the plurality of cameras 121 while alternately cooperating with the light transmitting portion 111 is improved on the other hand.

Figure 4:
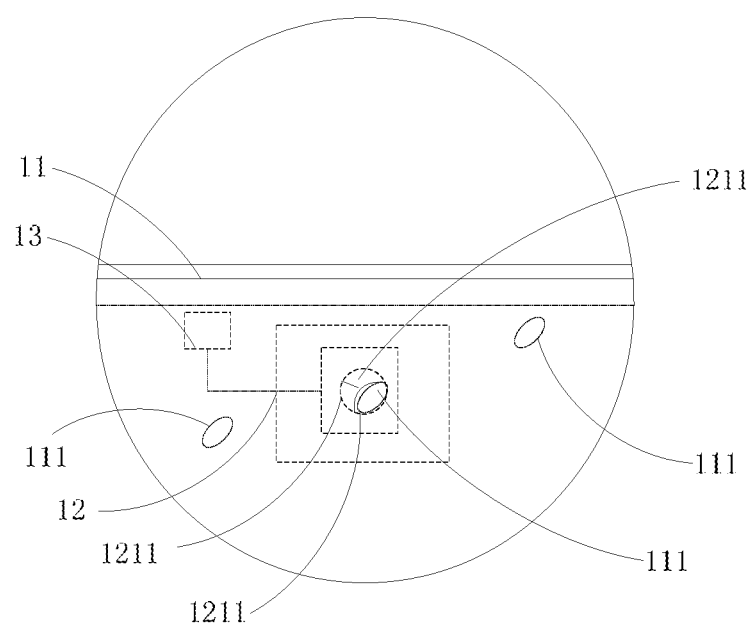
FIG. 4 is a partially enlarged structural schematic view of an electronic apparatus some other embodiments of the present disclosure.

In a case that the plurality of light transmitting portions 111 are provided on the screen 11:

In one embodiment, the camera assembly 12 includes one camera 121 and the camera 121 is movably assembled under the screen 11 so that each of photographing sections 1211 of the camera 121 cooperates with the plurality of light transmitting portions 111, respectively. As shown in FIG. 4, by providing a plurality of light transmitting portions 111 for the screen 11, it is convenient to set movement trace of the camera 121 so that different photographing sections 1211 formed by different portions of lens of the camera 121 cooperate with different light transmitting portions 111 during movement of the camera 121. Furthermore, light transmitting portions 111 located at different positions of the screen 11 can also increase photographing angles for different photographing sections 1211 to the scene to be photographed, facilitating final integration operation of the main control 122. Alternatively, for a case that a plurality of light transmitting portions 111 are provided on the screen 11 and the camera unit 12 includes one camera 121, a certain photographing section 1211 formed by specified portions of the lens of the camera 121 may cooperate with each of the different light transmitting portions 111, respectively. So, an angle of view can be changed by cooperation of the same photographing section 1211 with the light transmitting portions 111 at different positions so as to collect an overall image of the scene to be photographed. By means of the same one photographing section 1211 cooperating with the light transmitting portions 111, complexity of movement of the camera 121 is reduced and the structural reliability is improved. In addition, cost of the camera assembly 12 is also reduced in view that the camera assembly 12 includes one camera 121.

As for an embodiment in which the camera 121 is movably assembled under the screen 11, the electronic apparatus 1 may further include a driving component 13 connected to the camera 121 to enable the camera 121 to be movably assembled under the screen 11. Driving speed of the driving component 13 is greater than a preset speed, so that the main control 122 can integrate partial image data collected by each of the photographing sections 1211 of the camera 121 to form an overall image of the scene to be photographed. For example, to realize corporation of each of the photographing sections 1211 of one camera 121 with two light transmitting portions 111 respectively, driving speed of the driving component 13 should ensure that total time taken by the camera 121 to cooperate with the two light transmitting portions 111 is less than a time period during which there are some changes happening in two regions in the scene, so that the main control 122 can perform integration of the image data at two locations of the scene.

It is required to note that the driving component 13 may be a motor or the like capable of realizing high-speed driving, but not limited thereto in the present disclosure.

Figure 5:
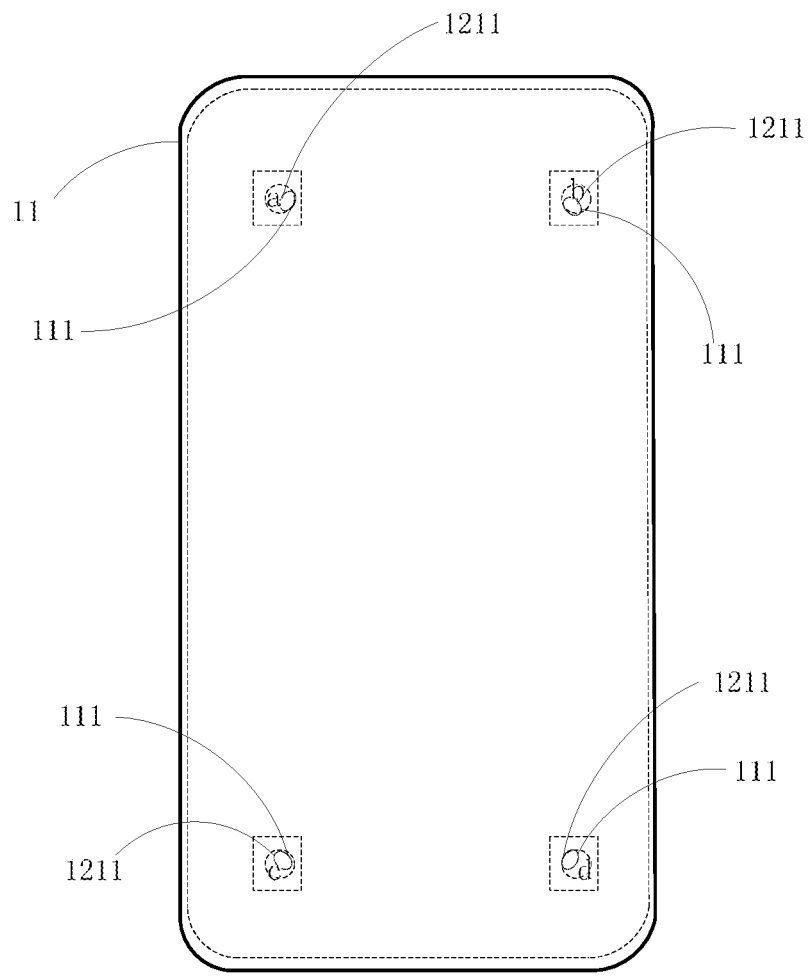
FIG. 5 is an enlarged structural schematic view of a screen of an electronic apparatus according to some other embodiments of the present disclosure.

In some other embodiments, the camera assembly 12 includes a plurality of cameras 121, and photographing sections 1211 formed by specified portions of each of lenses of the cameras 121 cooperate with the plurality of light transmitting portions 111 in a one-to-one correspondence. For example, as shown in FIG. 5, the camera assembly 12 includes four cameras 121 with reference numerals "a", "b", "c", and "d". A photographing section 1211 formed by a specified portion of the lens of "a" camera 121 is located at a lower right corner of the "a" camera 121 for collecting partial image data of an upper left region in the scene to be photographed. A photographing section 1211 formed by a specified portion of the lens of "b" camera 121 is located at a lower left corner of the "b" camera 121 for collecting partial image data of an upper right region in the scene to be photographed. A photographing section 1211 formed by a specified portion of the lens of "c" camera 121 is located at an upper right corner of the "c" camera 121 for collecting partial image data of a lower left region in the scene to be photographed. A photographing section 1211 formed by a specified portion of the lens of "d" camera 121 is located at an upper left corner of the "d" camera 121 for collecting partial image data of a lower right region in the scene to be photographed. Each of the photographing sections 1211 of the four cameras 121 with the reference numbers "a", "b", "c", and "d" cooperates with light transmitting portions 111 at different positions of the screen 11 to collect partial image data, and the main control 122 integrates all the partial image data to finally produce an overall image of the scene. As mentioned above, since the camera assembly 12 includes a plurality of cameras 121, and each of the photographing sections 1211 formed by the specified portions of lenses of the plurality of cameras 121 fixedly cooperates with the light transmitting portions 111 at different positions of the screen 11, movement of the cameras 121 during the photographing process is not necessary, and thereby structure of the camera assembly 12 is simplified as a whole and the structural reliability of the camera assembly 12 is improved.

It is required to note that the screen 11 includes a plurality of blocks corresponding to different orientations of the scene to be photographed, and a plurality of regions corresponding to the blocks are provided under the screen 11. The screen 11 is provided with a plurality of light transmitting portions 111 disposed in different regions below the screen 11 so as to obtain an enlarged angle of view to collect the scene to be photographed when each of the photographing sections 1211 cooperates with the respective light transmitting portion 111, which is able to provide convenience for final integration by the main control 122. For example, when the camera assembly 12 includes four cameras 121 with reference numbers "a", "b", "c", and "d", light transmitting portions 111 may be disposed at an upper left, an upper right, a lower left, and a lower right regions of the screen 11, respectively so that each of the four cameras 121 cooperates with each of the four light transmitting portions 111, respectively.

Furthermore, the light transmitting portion 111 may be disposed at an edge region of the screen 11 to prevent the light transmitting portion 111 from interfering with a central region of the screen 11, thereby improving an effect of the overall display of the screen 11. The edge region includes a top edge region, a left edge region, a right edge region, and a bottom edge region of the screen 11. The light transmitting portion 111 may be disposed at any one or more of the top edge region, the left edge region, the right edge region, and the bottom region to suit different needs of the camera assembly 12 when in use.

Figure 6:
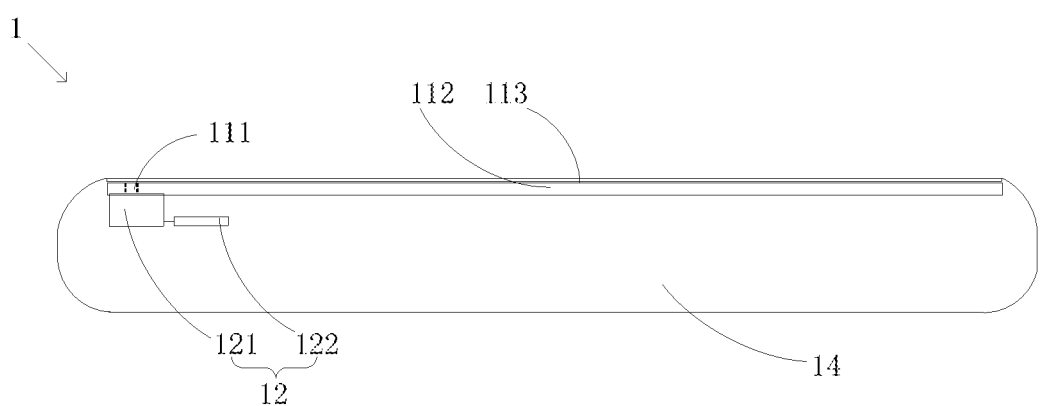
FIG. 6 is a structural schematic view of a cross-section of an electronic apparatus according to some embodiments of the present disclosure.

In the above embodiments, the light transmitting portion 112 may be a structural member made of a transparent material. Alternatively, as shown in FIG. 6, the screen 11 may include a display layer 112 and a cover layer 113. The light transmitting portion 111 may be a light transmitting hole disposed in the display layer 112, which reduces machining of the cover layer 113 in structure with low complexity and difficulty of process on one hand, and avoids influences of the light transmitting holes on effect of the overall display and appearance of the screen 11 by covering with the cover layer 113 on the other hand.

For example, the light transmitting portion 111 can be machined on the screen 11 by a laser process. A laser spot of a solid laser can realize machining of the light transmitting portion 111 of less than 20 micrometers, thereby improving accuracy of the light transmitting portion 111 in size and position, and hence improving overall display effect of the screen 11.

The screen 11 may be a general non-flexible display screen or a flexible display screen, and the present disclosure is not limited thereto. Since overlapping structure of functional layers of the flexible display screen facilitates to realize machining and operating of an opening, difficulty of machining process of the light transmitting portion 111 is reduced.

In addition, the electronic apparatus 1 further includes an apparatus body 14 comprising at least one screen assembling surface. A display layer 112 of the screen 11 covers the screen assembling surface to provide an effect of a full screen display. At this time, since the light transmitting portion 111 is disposed on the screen 11 and the camera assembly 12 is disposed under the screen 11, it facilitates to prevent the camera assembly 12 from occupying the screen, increasing the screen-to-body ratio of the screen 11. Alternatively, the display layer 112 of the screen 11 may cover a partial area of the screen assembling surface. At this time, the light transmitting portion 111 disposed on the screen 11 and the camera assembly 12 disposed under the screen 11 can still reduce an area of the screen assembling surface by which the non-display area is occupied, providing more installation space for functional components such as a play module, a photosensitive module, and the like.

The various device components, circuits, portions, blocks, units, modules, or sections may have modular configurations, or are composed of discrete components, but nonetheless can be referred to as "modules," "portions" or "sections" in general. In other words, the components, circuits, portions, blocks, units, modules, or sections referred to herein may or may not be in modular forms.

It should be noted that the electronic apparatus 1 can be a mobile phone, a vehicle terminal, a tablet computer, a medical terminal, etc., and the present disclosure is not limited thereto.

By disposing the camera assembly 12 of the electronic apparatus 1 under the screen 11 and setting the structural size of the light transmitting portion 111 smaller than the minimum resolution threshold of the naked eyes, the light transmitting portion 111 on the screen 11 is invisible to the naked eyes. The camera 121 of the camera assembly 12 includes a plurality of photographing sections 1211, and collects partial image data in the scene to be photographed by cooperation of each of the photographing sections 1211 with a light transmitting hole. The main control 122 integrates all the partial image data, and finally produces an overall image of the scene to be photographed. Through above structural configuration, not only realization of a photographing function of the camera assembly 12 of the electronic apparatus 1 is ensured, but also the screen-to-body ratio of the screen 11 is increased, while avoiding interference of the camera assembly 12 with display effects of the screen 11.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, flexible display, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An electronic apparatus, comprising:
a screen provided with at least one light transmitting portion having a structural size smaller than a minimum visual resolution threshold of naked eyes; and
a camera assembly disposed under the screen and comprising a main control and at least one camera having a plurality of photographing sections,
wherein a photographing angle of view of each of the plurality photographing sections is configured to correspondingly photograph a partial area of a scene to be photographed;
wherein the plurality of photographing sections correspondingly cooperate with the at least one light transmitting portion to collect partial image data of the scene to be photographed, and
wherein the main control is configured to process the partial image data to produce an overall image of the scene to be photographed.

2. The electronic apparatus according to claim 1, wherein the screen is provided with one light transmitting portion, the camera assembly comprises one camera, different portions of a lens of the camera form the plurality of photographing sections, and the camera is movably assembled under the screen such that each of the photographing sections of the camera alternately cooperates with the light transmitting portion.

3. The electronic apparatus of claim 2, further comprising a driving assembly connected to the camera to enable the camera to be movably assembled under the screen, and wherein a driving speed of the driving component is greater than a preset speed.

4. The electronic apparatus according to claim 1, wherein the screen is provided with one light transmitting portion, the camera assembly comprises a plurality of cameras, specified portions of each lens of the cameras form the plurality of photographing sections, and the cameras are movably assembled under the screen such that each of the photographing sections of the plurality of cameras alternately cooperates with the light transmitting portion.

5. The electronic apparatus according to claim 4, wherein the plurality of cameras are disposed along a circumferential direction of the light transmitting portion.

6. The electronic apparatus of claim 4, further comprising a driving assembly connected to the camera to enable the camera to be movably assembled under the screen, and wherein a driving speed of the driving component is greater than a preset speed.

7. The electronic apparatus according to claim 1, wherein the screen is provided with a plurality of light transmitting portions, the camera assembly comprises one camera, and the camera is movably assembled under the screen such that each of the photographing sections formed by different portions of a lens of the camera correspondingly cooperates with respective one of the light transmitting portions, or each of the photographing sections formed by specified portions of the lens of the camera cooperates with respective one of the light transmitting portions.

8. The electronic apparatus of claim 7, further comprising a driving assembly connected to the camera to enable the camera to be movably assembled under the screen, and wherein a driving speed of the driving component is greater than a preset speed.

9. The electronic apparatus according to claim 1, wherein the screen is provided with a plurality of light transmitting portions, the camera assembly comprises a plurality of cameras, and the photographing sections formed by specified portions of lenses of the cameras cooperate with the plurality of the light transmitting portions in a one-to-one correspondence.

10. The electronic apparatus according to claim 1, wherein the screen is provided with a plurality of light transmitting portions, the screen comprises a plurality of blocks corresponding to different orientations of the scene to be photographed, there are a plurality of regions corresponding to the blocks below the screen, and the plurality of light transmitting portions are disposed respectively in a different one of the regions below the screen.

11. The electronic apparatus according to claim 1, wherein the light transmitting portions are disposed at an edge region of the screen.

12. The electronic apparatus according to claim 1, wherein a structural size of the light transmitting portion is smaller than a structural size of a display unit of the screen.

13. The electronic apparatus of claim 1, wherein the minimum visual resolution threshold of the naked eyes is less than or equal to 100 microns.

14. A mobile phone comprising:
an organic light-emitting diode (OLED) display or a liquid-crystal display (LCD) screen provided with at least one light transmitting portion having a structural size smaller than a minimum visual resolution threshold of naked eyes; and
a camera assembly disposed under the screen and comprising a main control and at least one camera having a plurality of photographing sections,
wherein a photographing angle of view of each of the plurality photographing sections is configured to correspondingly photograph a partial area of a scene to be photographed;
wherein the plurality of photographing sections correspondingly cooperate with the at least one light transmitting portion to collect partial image data of the scene to be photographed, and
wherein the main control is configured to process the partial image data to produce an overall image of the scene to be photographed.

15. The mobile phone according to claim 14, wherein the screen is provided with one light transmitting portion, the camera assembly comprises one camera, different portions of a lens of the camera form the plurality of photographing sections, and the camera is movably assembled under the screen such that each of the photographing sections of the camera alternately cooperates with the light transmitting portion.

16. The mobile phone according to claim 14, wherein the screen is provided with one light transmitting portion, the camera assembly comprises a plurality of cameras, specified portions of each lens of the cameras form the plurality of photographing sections, and the cameras are movably assembled under the screen such that each of the photographing sections of the plurality of cameras alternately cooperates with the light transmitting portion.

17. The mobile phone according to claim 16, wherein the plurality of cameras are disposed along a circumferential direction of the light transmitting portion.

18. The mobile phone according to claim 14, wherein the screen is provided with a plurality of light transmitting portions, the camera assembly comprises one camera, and the camera is movably assembled under the screen such that each of the photographing sections formed by different portions of a lens of the camera correspondingly cooperates with respective one of the light transmitting portions, or each of the photographing sections formed by specified portions of the lens of the camera cooperates with respective one of the light transmitting portions.

19. The mobile phone according to claim 14, wherein:
the screen is provided with a plurality of light transmitting portions, the screen comprises a plurality of blocks corresponding to different orientations of the scene to be photographed, there are a plurality of regions corresponding to the blocks below the screen, and the plurality of light transmitting portions are disposed respectively in a different one of the regions below the screen;
the light transmitting portions are disposed at an edge region of the screen;
a structural size of the light transmitting portion is smaller than a structural size of a display unit of the screen;
the minimum visual resolution threshold of the naked eyes is less than or equal to 100 microns.

20. The mobile phone of claim 19, further comprising:
a driving assembly connected to the camera to enable the camera to be movably assembled under the screen, and wherein a driving speed of the driving component is greater than a preset speed; and
a non-transitory computer-readable storage medium to enable the main control to process the partial image data to produce the overall image of the scene to be photographed.

* * * * *